US008593408B2

(12) United States Patent
Ryu et al.

(10) Patent No.: US 8,593,408 B2
(45) Date of Patent: Nov. 26, 2013

(54) ELECTRONIC DOCUMENT REPRODUCTION APPARATUS AND REPRODUCING METHOD THEREOF

(75) Inventors: Seung-Kyoon Ryu, Seoul-si (KR); Jung-Wook Hwang, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1064 days.

(21) Appl. No.: 12/235,260

(22) Filed: Sep. 22, 2008

(65) Prior Publication Data
US 2009/0237367 A1  Sep. 24, 2009

Related U.S. Application Data

(60) Provisional application No. 61/038,055, filed on Mar. 20, 2008.

(30) Foreign Application Priority Data

May 14, 2008 (KR) .............................. 2008-0044652

(51) Int. Cl.
*G06F 3/041* (2006.01)

(52) U.S. Cl.
USPC ......................................... 345/173; 345/184

(58) Field of Classification Search
USPC .............................. 345/173; 715/776, 863, 864
See application file for complete search history.

(56) References Cited

U.S. PATENT DOCUMENTS 5,463,725 A * 10/1995 Henckel et al. ............... 715/776
5,663,748 A * 9/1997 Huffman et al. .............. 345/173
5,900,876 A    5/1999 Yagita et al.
2003/0048251 A1    3/2003 Liang et al.
2004/0125081 A1 * 7/2004 Hayakawa .................... 345/156
2009/0058828 A1 * 3/2009 Jiang et al. .................... 345/173
2009/0267909 A1 * 10/2009 Chen et al. .................... 345/173

FOREIGN PATENT DOCUMENTS

| CN | 1568499 A | 1/2005 |
| JP | 2007-334914 A | 12/2007 |
| WO | WO 2005/086133 A1 | 9/2005 |

* cited by examiner

*Primary Examiner* — Quan-Zhen Wang
*Assistant Examiner* — Sepideh Ghafari
(74) *Attorney, Agent, or Firm* — Birch, Stewart, Kolasch & Birch, LLP

(57) ABSTRACT

The present invention relates to an electronic document reproduction apparatus supporting a preview function upon outputting an electronic book, and a reproducing method thereof. The electronic document reproduction apparatus includes: an input/output unit for outputting contents of an electronic document and receiving a user's instruction from a user; a storage unit for storing data of the electronic document; and a controller for searching for an output position of a corresponding electronic document according to the users instruction input through the input/output unit, and displaying the corresponding electronic document, wherein the controller receives a preview execution instruction through the input/output unit and provides a preview function for a corresponding position to the electronic document, and the controller receives a page selection instruction and sets a corresponding page as an output position.

24 Claims, 16 Drawing Sheets

FIG 4C

| 29 | 30 |
|---|---|
| As having an interest in one field and putting much effort, we can see a deeper and deeper world unknown to others in the field.<br>As it is said that practice makes a value, more training brings forth greater skillfulness.<br>While training is being repeated, power is accumulated to arrive at a higher world.<br>Repetition is a task of breaking our own limits. | I eat an orange.<br>The orange is sweet.<br>Every piece of the fruit has a different taste.<br>Manufactured things don't have such things, but have the same taste at all time.<br>Duplicates and manufactured goods are lifeless from the beginning.<br>Life is the only thing in existence with its own peculiar manner. |

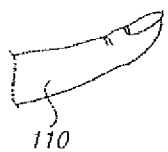

110

ELECTRONIC DOCUMENT REPRODUCTION APPARATUS AND REPRODUCING METHOD THEREOF

CROSS REFERENCE TO RELATED APPLICATIONS

The present application is related to, and claims priority to, priority application NO. KR 10-2008-0044652 filed on May 14, 2008, and application NO. U.S. 61/038,055 filed on Mar. 20, 2008, the entire contents of which being incorporated herein by reference.

BACKGROUND OF THE INVENTION

1. Field of the invention

The present invention relates to an electronic document reproduction apparatus supporting a preview function upon outputting an electronic book, and a reproducing method thereof. In more particular, the present invention relates to a method, computer program product and apparatus for searching for contents of a previous page or following page while reading an electronic document (e.g. an electronic book) through the apparatus, moving to a corresponding page, and returning to an original page.

2. Description of the Related Art

Recently, with the development of electronic devices in various fields, electronic books to be read through electronic devices have been developed and released into the market. Further, such an electronic book reproduction function has sometimes been installed as an additional function in electronic devices, such as mobile telephones, PMPs, MP3 players, etc., and has been released into the market.

However, the conventional electronic document reproduction apparatus has problems as follows.

That is, in the case of reading a real book, in order to check the contents of a previous page or following page, the user would search for a desired page by rapidly turning the pages of the book through use of the user's tactile sensation, open the desired page, read the contents of the desired page with his/her fingers inserted between pages including the original page, and then return to the original page. However, since the conventional electronic document reproduction apparatus does not support such a manual search function, the user checks contents after turning the pages of an electronic book by one page or by a predetermined number of pages, and then must reversely repeat such a procedure in order to return to the original page.

As a result, the conventional technology has a problem in that it is difficult to search for contents as rapidly and easily as a real book.

SUMMARY OF THE INVENTION

Accordingly, the present invention has been made to solve the above-mentioned problems occurring in the related art, and the present invention provides an electronic document reproduction apparatus which has a preview function for being able to easily and rapidly search for other pages during the reading of an electronic book, to move to a desired page, and to return to the original page, and a corresponding computer program product and reproducing method.

In accordance with an aspect of the present invention, there is provided an electronic document reproduction apparatus including: an input/output unit for outputting contents of an electronic document and receiving a user's instruction from a user; a storage unit for storing data of the electronic document; and a controller for searching for an output position of a corresponding electronic document according to the user's instruction input through the input/output unit, and displaying the corresponding electronic document, wherein the controller receives a preview execution instruction through the input/output unit and provides a preview function for a corresponding position to the electronic document, and the controller receives a page selection instruction and sets a corresponding page as an output position.

In this case, the input/output unit may include: an output unit for outputting the electronic document; and a touch input unit for receiving a screen touch input by the user, wherein the controller may display a volume display section representing a volume of the electronic document, and recognize the user's touch input into the volume display section as the preview execution instruction.

Also, the controller may display a corresponding page according to a change of a touch position by the user.

In addition, the input/output unit may include: an output unit for outputting the electronic document; and a touch input unit for receiving a screen touch input by the user, wherein the controller may recognize the user's touch input into a predetermined position as the preview execution instruction; and when the touch has moved in a predetermined direction, the controller may recognize the movement as a page movement instruction, and displace an output page in a direction and at a speed corresponding to a movement direction and a movement distance of the touch.

Meanwhile, the input/output unit may includes: an output unit for outputting the electronic document; and a touch input unit for sensing a touch position and a touch pressure by a screen touch of the user, wherein the controller may recognize the user's touch input into a preset position as the preview execution instruction; and determine a change speed of an output page according to the touch pressure of the user.

Also, the input/output unit may include: an output unit for outputting the electronic document; and a touch input unit for recognizing a three dimensional coordinate value of a position of a touch by the user, wherein the controller may recognize the user's touch input into a preset position as the preview execution instruction; and determine a change speed of an output page according to a height of the touch.

In addition, the controller may determine a change direction of the electronic document according to a change of the user's touch position along a horizontal direction.

Also, in a preview mode, when a touch of the user has made contact with a touch panel, the controller may release the preview mode, and establish a position of the electronic document, finally output in the preview mode, as a display position.

In this case, when the controller has received a touch release instruction by the user, the controller may release the preview mode, and establish a position of the electronic document, output before the preview mode, as a display position.

Also, when a touch of the user has moved in a preset direction, the controller may release the preview mode, and establish a position of the electronic document, finally output in the preview mode, as a display position.

In addition, the input/output unit may include: an output unit for outputting the electronic document; and a jog dial for receiving a user's instruction, wherein, when a preview mode is executed, the controller may determine a change direction of an output page according to a rotation direction of the jog dial; and determine a change speed of the output page according to a degree of rotation of the jog dial.

Also, when the controller has sensed a press input of the jog dial, the controller may establish a position of the electronic document, finally output in the preview mode, as a display position.

Here, when the controller has received a release instruction to release the preview mode, the controller may release the preview mode, and establish a position of the electronic document, output before the preview mode, as a display position.

Meanwhile, the electronic document reproduction may further include a sensing unit for sensing a horizontal inclination, wherein, when a preview mode is executed, the controller may determine a change direction and a change speed of an output page according to an inclination value sensed from the sensing unit.

In addition, when the controller has sensed a user's touch input through the input/output unit, the controller may release the preview mode, and establish a position of the electronic document, finally output in the preview mode, as a display position.

Also, in the preview mode, an electronic document, which is changed and displayed, may have a different shadow so as to enable the user to recognize the page to be a page of the preview mode.

In addition, in the preview mode, a corresponding page of an electronic document, which is changed and displayed, may include a position indication icon output on a screen, in which the position indication icon indicates a position of the corresponding page with respect to an entire or partial volume of an electronic document.

Also, in the preview mode, an electronic document, which is changed and displayed, may display an entire or part of contents of a corresponding page.

In addition, in the preview mode, an electronic document, which is changed and displayed, may display only specified contents among contents of a corresponding page, wherein the specified contents may include at least one of an image and a table.

Also, the electronic document reproduction apparatus may output corresponding sound signals upon a preview mode execution, upon a page movement, upon a preview mode release, and upon a page selection, respectively.

Meanwhile, according to another aspect of the present invention, there is provided a computer program product and a method for reproducing an electronic document by an electronic document reproduction apparatus which outputs electronic document data through a display device, the method including the steps of: when a preview execution instruction has been input by a user, displaying an entire or a part of a corresponding page by executing a preview mode; and when a page selection instruction has been input, selecting a corresponding page as an output page, wherein the preview execution instruction is issued by a touch of the user on a volume display section that represents a volume of the document.

In addition, according to still another aspect of the present invention, there is provided a method for reproducing an electronic document by an electronic document reproduction apparatus which outputs electronic document data through a display device, the method including the steps of: when a preview execution instruction has been input by a user, displaying an entire or a part of a corresponding page by executing a preview mode; and when a page selection instruction has been input, selecting a corresponding page as an output page, wherein the preview execution instruction is issued by a touch of the user on a predetermined position in a screen; and when the touch has moved in a predetermined direction, the movement is recognized as a page movement instruction, and a position of an output page is changed in a direction and at a speed corresponding to a movement direction and a movement distance of the touch.

Also, according to still another aspect of the present invention, there is provided a method for reproducing an electronic document by an electronic document reproduction apparatus which outputs electronic document data through a display device, the method including the steps of: when a preview execution instruction has been input by a user, displaying an entire or a part of a corresponding page by executing a preview mode; and when a page selection instruction has been input, selecting a corresponding page as an output page, wherein the preview execution instruction is issued by a users touch on a predetermined position in a touch input unit that senses a touch position and a touch pressure; and a change speed of an output page is changed according to the touch pressure.

In addition, according to still another aspect of the present invention, there is provided a computer program product and a method for reproducing an electronic document by an electronic document reproduction apparatus which outputs electronic document data through a display device, the method including the steps of: when a preview execution instruction has been input by a user, displaying an entire or a part of a corresponding page by executing a preview mode; and when a page selection instruction has been input, selecting a corresponding page as an output page, wherein the preview execution instruction is issued by a user's touch on a predetermined position in a touch input unit that recognizes a three dimensional coordinate value of a touch position; and a change speed of an output page is determined according to a height of the touch.

Also, according to still another aspect of the present invention, there is provided a computer program product and a method for reproducing an electronic document by an electronic document reproduction apparatus which outputs electronic document data through a display device, the method including the steps of: when a preview execution instruction has been input by a user, displaying an entire or a part of a corresponding page by executing a preview mode; and when a page selection instruction has been input, selecting a corresponding page as an output page, wherein, during execution of the preview mode, a page movement is issued by rotation of a jog dial included in the electronic document reproduction apparatus; a change direction of an output page is determined according to a rotation direction of the jog dial; and a change speed of the output page is determined according to a degree of rotation of the jog dial.

Meanwhile, according to still another aspect of the present invention, there is provided a computer program product and a method for reproducing an electronic document by an electronic document reproduction apparatus which outputs electronic document data through a display device, the method including the steps of: when a preview execution instruction has been input by a user, displaying an entire or a part of a corresponding page by executing a preview mode; and when a page selection instruction has been input selecting a corresponding page as an output page, wherein, during execution of the preview mode, a page movement is issued according to a sensing result of a sensing unit, which senses a horizontal inclination of the electronic document reproduction apparatus; and a change direction and a change speed of an output page is determined according to an inclined direction and an inclination angle of the electronic document reproduction apparatus.

The electronic document reproduction apparatus and the reproducing method thereof according to the present invention, as described above, have the following effects.

That is, since a preview function for being able to easily and rapidly search for other pages during the reading of an electronic book, to move to a desired page, and to return to the original page, is provided, there is an advantage in that it is easy to search for and move to a desired page, and to return to the original page upon using an electronic document.

In addition, according to the present invention, since the functions are executed in a manner similar to that used while the user reads a real book, the user can execute a desired function through the same action as that used while the user reads a real book, so that the convenience of the user is further improved.

In addition, there are provided a device, computer program product and method for reproducing an electronic document by an electronic document reproduction apparatus which outputs electronic document data through a display device, the method comprising the steps of: displaying an icon representing a volume of the electronic document; entering an electronic document preview mode in response to a touch by the user to the icon; displaying, in the electronic document preview mode, at least a part of a page of the electronic document; and selecting another page as an output page in response to a page selection instruction input by the user.

In addition, there are provided a device, computer program product and method for reproducing an electronic document by an electronic document reproduction apparatus which outputs electronic document data through a display device, the method comprising the steps of: entering an electronic document preview mode in response to a user input; displaying at least a part of a page of the electronic document; changing from the page to another page in a direction and speed corresponding to a rotation direction and rotation amount of a jog dial; and selecting the another page as an output page to be displayed in a non-preview mode in response to a page selection instruction input by the user.

In addition, there are provided a device, computer program product and method for reproducing an electronic document by an electronic document reproduction apparatus which outputs electronic document data through a display device, the method comprising the steps of: entering an electronic document preview mode in response to a user input; displaying at least a part of a page of the electronic document; changing to another page in response to a sensed inclination of the electronic document reproduction apparatus, wherein the step of changing includes determining a page change direction and a page change speed according to a sensed incline direction and a sensed incline angle of the electronic document reproduction apparatus; and selecting the another page as an output page to be displayed in a non-preview mode in response to a page selection instruction input by the user.

BRIEF DESCRIPTION OF THE DRAWINGS

The above and other objects, features and advantages of the present invention will be more apparent from the following detailed description taken in conjunction with the accompanying drawings, in which:

FIGS. 4A to 4D are views illustrating scenes in which electronic documents are reproduced according to a second embodiment of the present invention;

DETAILED DESCRIPTION OF THE EXEMPLARY EMBODIMENTS

Hereinafter, an electronic document reproduction apparatus according to exemplary embodiments of the present invention will be described in detail with reference to the accompanying drawings.

Figure 1:
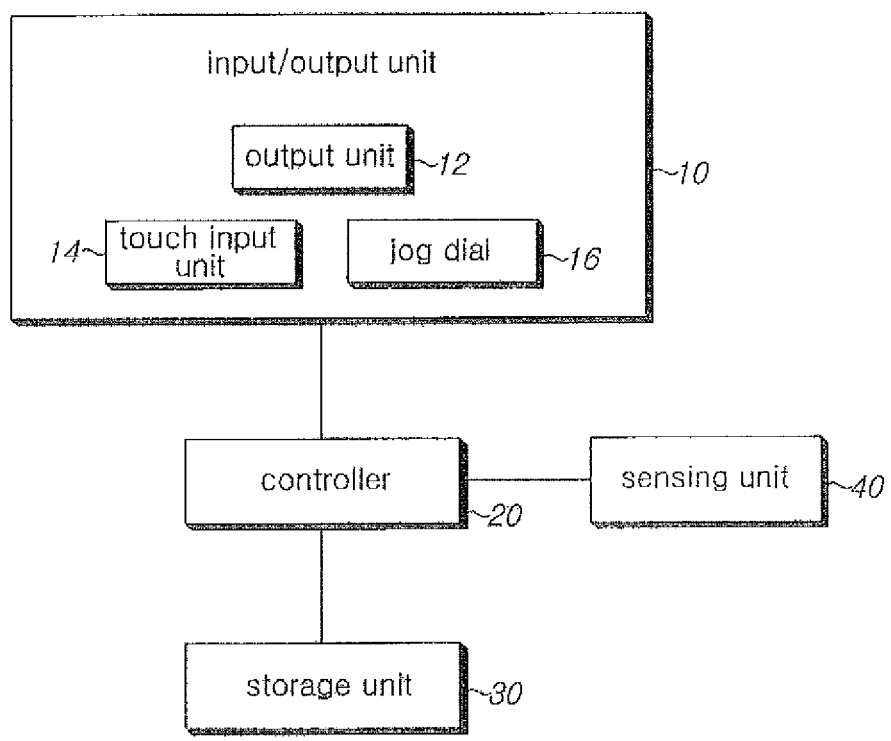
FIG. 1 is a block diagram illustrating the configuration of an electronic document reproduction apparatus according to an exemplary embodiment of the present invention.

FIG. 1 is a block diagram illustrating the configuration of an electronic document reproduction apparatus according to an exemplary embodiment of the present invention.

As shown in FIG. 1 the electronic document reproduction apparatus 100 according to an exemplary embodiment of the present invention includes an input/output unit 10 for receiving a user's instruction and outputting an electronic document, a storage unit 30 for storing electronic document data, and a controller 20 for controlling the input/output unit 10 and the storage unit 30 according to the user's instruction input through the input/output unit 10.

Here, the electronic document reproduction apparatus 100 includes various electronic devices, such as mobile terminals, PMPs, MP3 players, etc., which support an electronic book (e-book) view function.

The input/output unit 10 includes an output 12 for displaying an electronic document, wherein the output unit 12 includes an image output unit configured by a general display screen and a sound output unit for output of sound.

In addition, the input/output unit 10 includes an input unit for receiving an instruction from the user, wherein the input unit includes a touch input unit 14 for touch input and/or a jog dial 16, which is a rotary input button. Other buttons or input mechanisms (e.g., toggle, roller ball, etc.) may also be used.

In this case, the touch input unit 14 may be a typical piezoelectric touch panel, a touch panel capable of sensing a difference between touch pressures, or a touch panel capable of recognizing three dimensional coordinate values of a touched position on/above the upper surface of the panel, as well as a direct touch.

These touch panels have already been applied to products and have been released into the market, so a detailed description about the configuration and principle thereof will be omitted.

Meanwhile, the electronic document reproduction apparatus according to an exemplary embodiment of the present invention may include a sensing unit 40 which contains a horizon sensor for sensing the horizontal inclination of the apparatus. The horizon sensor includes various horizon sensors, containing a widely used gyro sensor, and is not limited to a specific sensor.

The sensing unit 40 functions to sense the horizontal inclination of the reproduction apparatus so that turning direction and speed for pages can be calculated according to the sensed horizontal inclination.

Meanwhile, the controller 20 for controlling these components receives a preview execution instruction input from the user according to various input methods (which will be described later in detail), executes a preview mode, and outputs a page of a corresponding electronic document.

The preview mode represents a mode of enabling the user to rapidly search for contents of previous pages or following pages during the reading of an electronic book. Here, a difference between the preview mode and a normal page turning operation is that, in the case of the preview mode, when the preview mode has been released, a page shift is performed to display a page of an electronic book which was displayed directly before the preview mode, regardless of turned pages.

Also, while the preview mode is being executed, the controller 20 may output pages while turning the pages at a constant speed (or a variable speed) according to an input of the user.

When a page selection instruction is input during execution of the preview mode, a corresponding page is set as an output page, and the preview mode is terminated.

Hereinafter, the method for reproducing an electronic document according to an exemplary embodiment of the present invention will be described in detail with reference to the accompanying drawings.

Furthermore, while the methods described herein are described relative to the device of FIG. 1, one in the art will understand that these methods may apply to a variety of electronic display devices, including a mobile communication terminal. The mobile communication terminal may be implemented in a variety of different configurations. Examples of such configurations include folder-type, slide-type, bar-type, rotational-type, swing-type and combinations thereof.

During typical operation of a wireless communication system, the base stations receive sets of reverse-link signals from various mobile terminals. The mobile terminals are engaging in calls, messaging, and other communications. Each reverse-link signal received by a given base station is processed within that base station. The resulting data is forwarded to an associated BSC. The BSC provides call resource allocation and mobility management functionality including the orchestration of soft handoffs between base stations. The BSCs also route the received data to the MSC, which provides additional routing services for interfacing with the PSTN. Similarly, the PSTN interfaces with the MSC, and the MSC interfaces with the BSCs, which in turn control the base stations to transmit sets of forward-link signals to the mobile terminals.

The environment may also include several global positioning system (GPS) satellites. Such satellites facilitate locating the position of some or all of the portable terminals. A position-location module of the portable terminal is typically configured to cooperate with the satellites to obtain desired position information. It is to be appreciated that other types of position detection technology, (i.e., location technology that may be used in addition to or instead of GPS location technology) may alternatively be implemented. If desired, some or all of the GPS satellites may alternatively or additionally be configured to provide satellite DMB transmissions.

Figure 2:
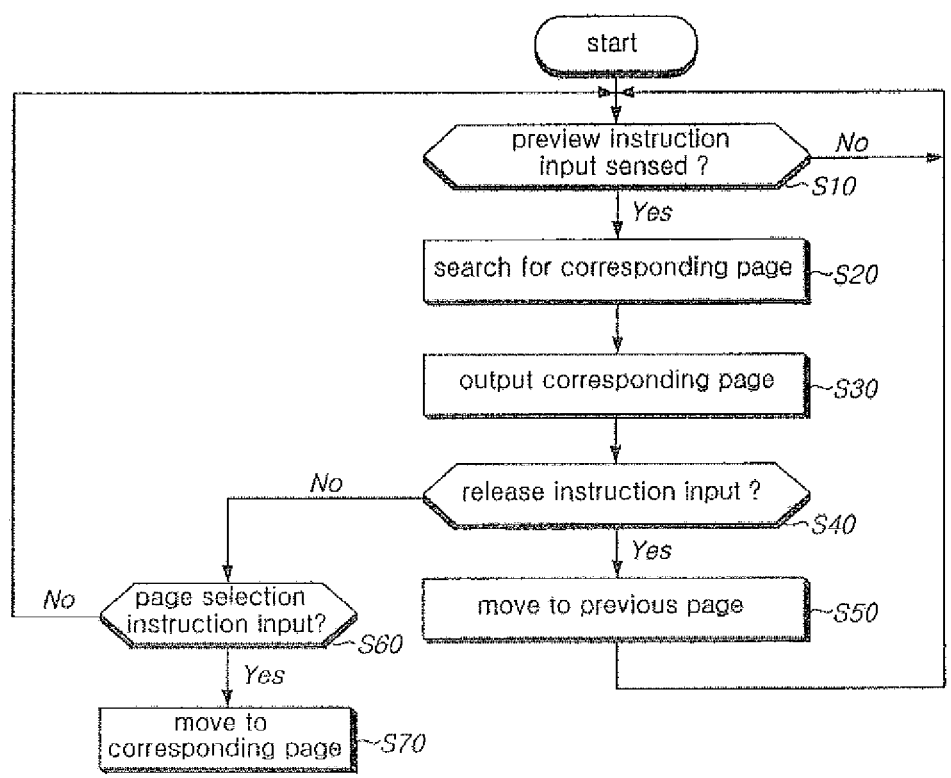
FIG. 2 is a flowchart illustrating the method for reproducing an electronic document according to an exemplary embodiment of the present invention.

FIG. 2 is a flowchart illustrating the method for reproducing an electronic document according to an exemplary embodiment of the present invention.

As shown in FIG. 2, when the controller 20 in the electronic document reproduction apparatus 100 according to an exemplary embodiment of the present invention senses an input of a preview execution instruction (which will be used as the same meaning as a "preview instruction" in this specification) in step 10, the controller 20 enters the preview mode, and searches for and outputs a corresponding page according to the preview execution instruction in steps 20 and 30.

Then, the controller 20 senses if a preview mode release instruction has been input in step 40. When the release instruction has been input, the controller 20 releases the preview mode while outputting a page output directly before the preview mode in step 50.

In contrast, when it is determined that the release instruction has not been input, the controller 20 senses if a page selection instruction has been input in step 60.

When the page selection instruction has been input, the controller 20 releases the preview mode while performing an output page shift to display a page on which the page selection instruction has been input in step 70.

Meanwhile, steps 20 and 30 of searching for and outputting a corresponding page may be performed in such a manner as to change an output page into a specific speed and specific direction according to an input of the user.

Also, the user input instructions, including the preview execution instruction, the preview mode release instruction, the page selection instruction, etc., may be implemented in various manners according to embodiments, which will now be described in detail with reference to exemplary embodiments of the present invention.

Hereinafter, scenes of execution of a preview mode in the electronic document reproduction apparatus according to an exemplary embodiment of the present invention will be described in detail with reference to the accompany drawings.

Figure 3A:
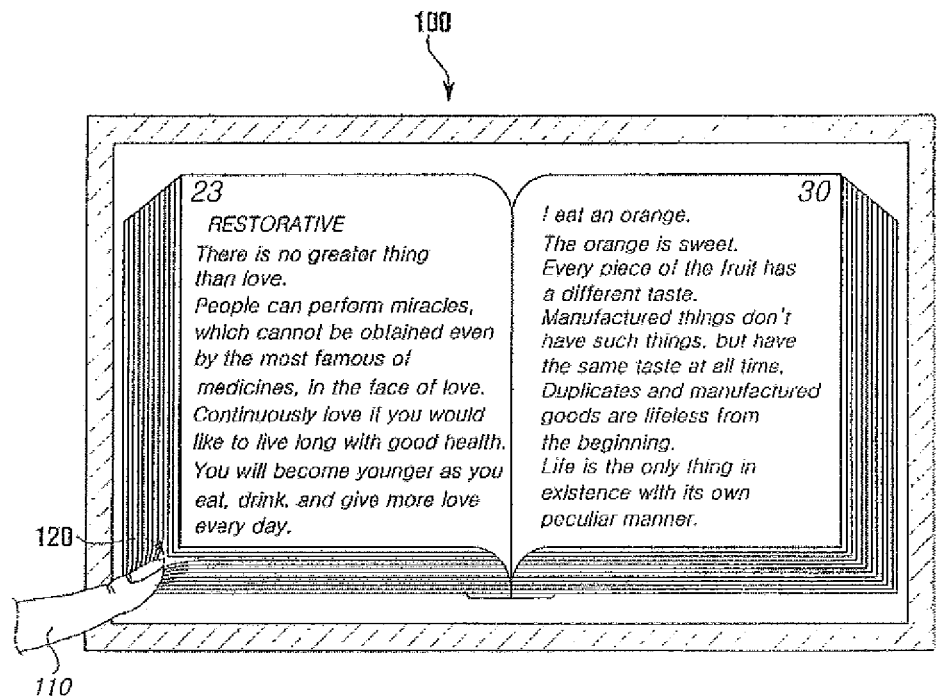
FIGS. 3A to 3E are views illustrating scenes in which electronic documents are reproduced according to a first embodiment of the present invention.
Figure 3B:
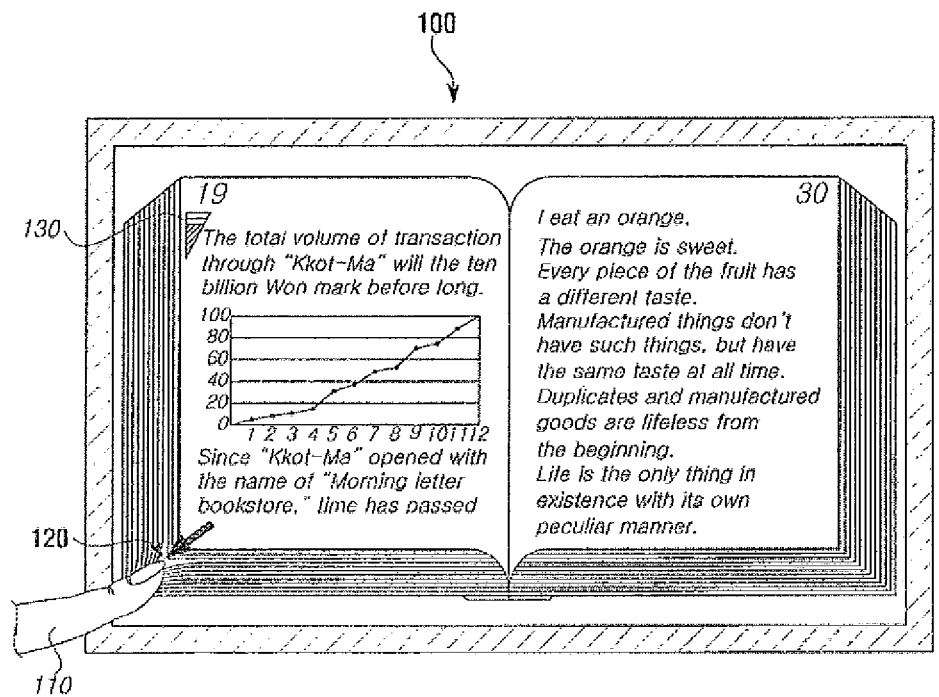
Figure 3C:
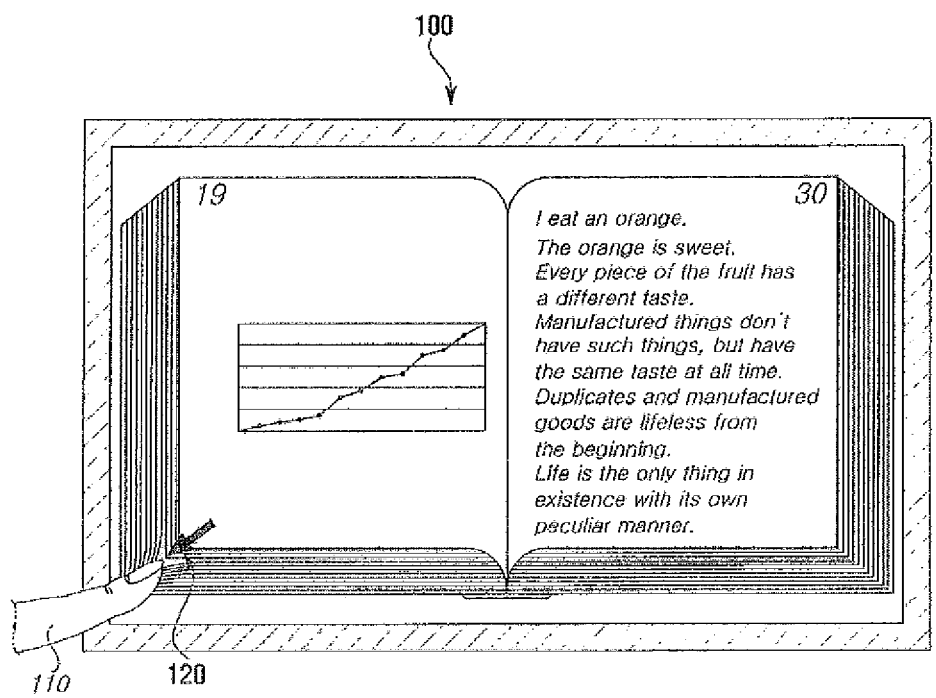
Figure 3D:
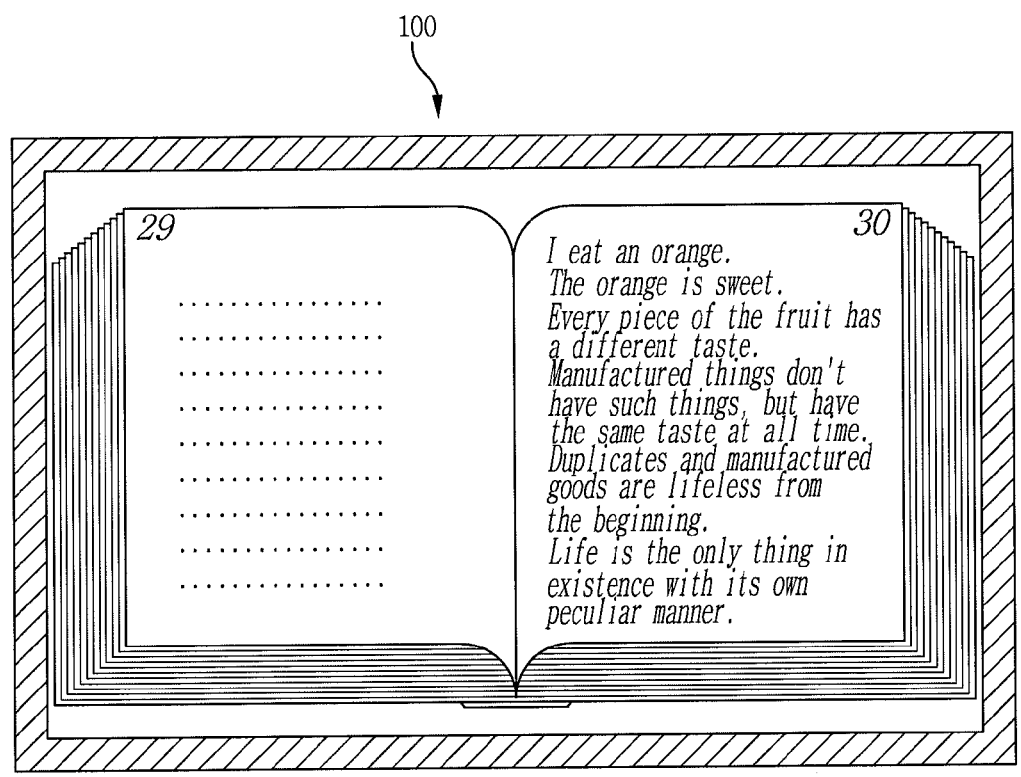
Figure 3D:
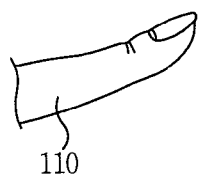
Figure 3E:
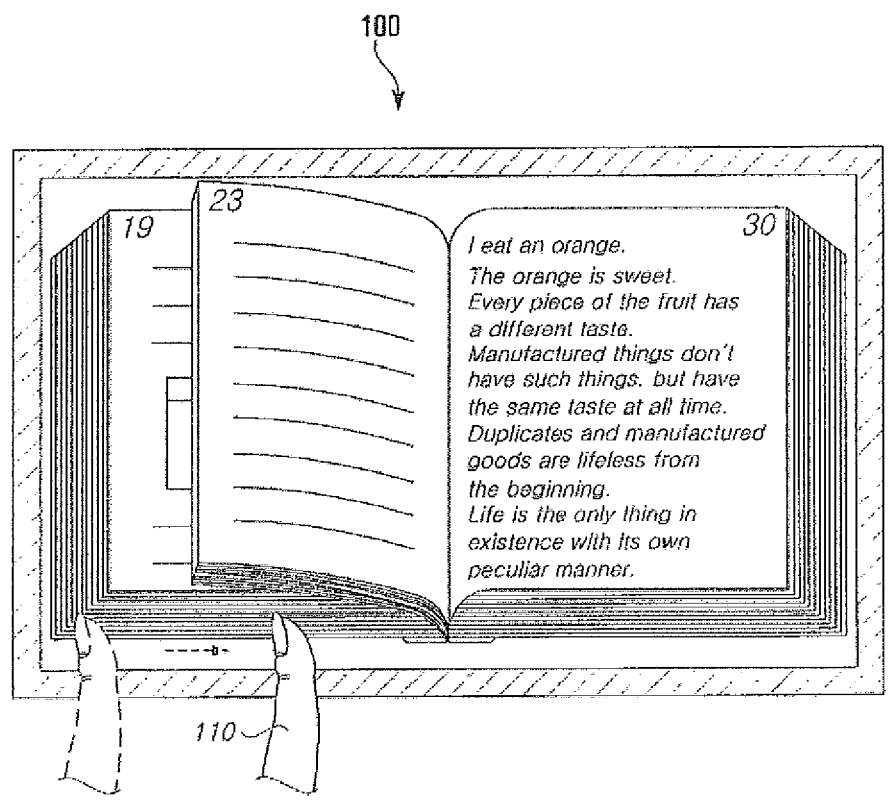

FIGS. 3A to 3E are views illustrating scenes in which electronic documents are reproduced according to a first embodiment of the present invention, wherein FIG. 3A illustrates a scene where a preview execution instruction is input, FIG. 3B illustrates a scene where a preview output page is changed, FIG. 3C illustrates a scene where the preview output page is output in a different appearance, FIG. 3D illustrates a scene where a preview release instruction is input, and FIG. 3E illustrates a scene where a page selection instruction is input.

As shown in FIGS. 3A to 3E, according to the first embodiment of the present invention, a preview execution instruction is issued when the user touches an input region 120 on a screen outputting an electric book. In this case, in the displayed electronic book, a volume display section representing the number of pages existing in the rear of an output page of the electronic book is displayed. The volume display section represents a portion corresponding to the edge portions of pages, which are sequentially overlapped when a book is opened, as shown in FIG. 3A. According to the first embodiment of the present invention, the volume display section corresponds to the input region 120 for execution of a preview execution instruction.

Here, when the user touches the volume display section, a portion of the volume display section is displayed in such a pressed shape as if the page edges of a real book have been pressed, thereby producing such an image as that of the real book.

While the touch is achieved by various touch tools, such as touch pens, etc., the following description will be given the case where a finger 110 of the user is used as a touch tool.

Meanwhile, when the touch by the user is input on a position within the input region 120, a page corresponding to the touched portion is displayed. In this case, the corresponding page represents a page of which the edge portion has been pressed by the touch of the user. FIG. 3A shows the case where not page 29, but page 23 is displayed as a page next to page 30.

In FIG. 3A, the left-hand page may correspond to a preview mode, and the right-hand page may correspond to a normal view mode. In this case, in order to represent that the left-hand page corresponds to the preview mode, contents displayed on the left-hand page may be displayed with a shadow different from that for contents displayed on the right-hand page (e.g. with a relatively thinner shadow, or a shadow with a different color or pattern).

Meanwhile, FIG. 3B illustrates a case where a touching finger has moved in a left downward direction within the volume display section.

In FIG. 3B, it can be understood that an output page has been changed from page 23 to page 19 according to the movement of the touching finger.

In this case, for the convenience of the user, a position indication icon 130 may be displayed on a portion of the screen.

The position indication icon 130 represents an icon for displaying an approximate position of a page currently output in a view mode within the whole pages or within entire remaining rear pages upon the view mode.

FIG. 3C illustrates an output scene in which only specified contents of a corresponding page is displayed in a preview mode. As shown in FIG. 3A, only a table in a corresponding page may be displayed, instead of the entire contents of the corresponding page. Here, the specified contents may include at least one of various components, including a table and an image, and may be determined according to the selection of the user.

As shown in FIG. 3D, when a preview release instruction has been input, the preview mode is released, and a page shift is performed to display the page before the preview mode. In this case, the preview release instruction is issued and input when the touch of the user has been released.

Meanwhile, as shown in FIG. 3E, when the touch of the user moves in a specific direction (in the right-hand direction) in the preview mode of FIG. 3B or 3C, it is recognized as the selection of a page selection mode, so that a page finally output in the preview mode is displayed as an output page while the preview mode is released. As a result, the user can again read the electronic book starting at the newly-selected page.

In this case, an image showing that pages are actually being turned may be displayed as shown in FIG. 3E, and a sound effect representing that the pages are being turned may be output through the sound output unit, in addition to the image. Alternatively, a tactile feedback (e.g., buzz or vibration) may be presented.

Meanwhile, FIGS. 4A to 4D are views illustrating scenes in which electronic documents are reproduced according to a second embodiment of the present invention, wherein the second embodiment of the present invention shows a case where the volume display section is not displayed, differently from the first embodiment of the present invention.

When the volume display section is displayed, an image similar to the appearance of a real book can be represented, but a space to display contents of an electronic document in becomes relatively smaller. Therefore, in the case of a device having a small screen, it may be efficient to apply the second embodiment of the present invention.

Figure 4A:
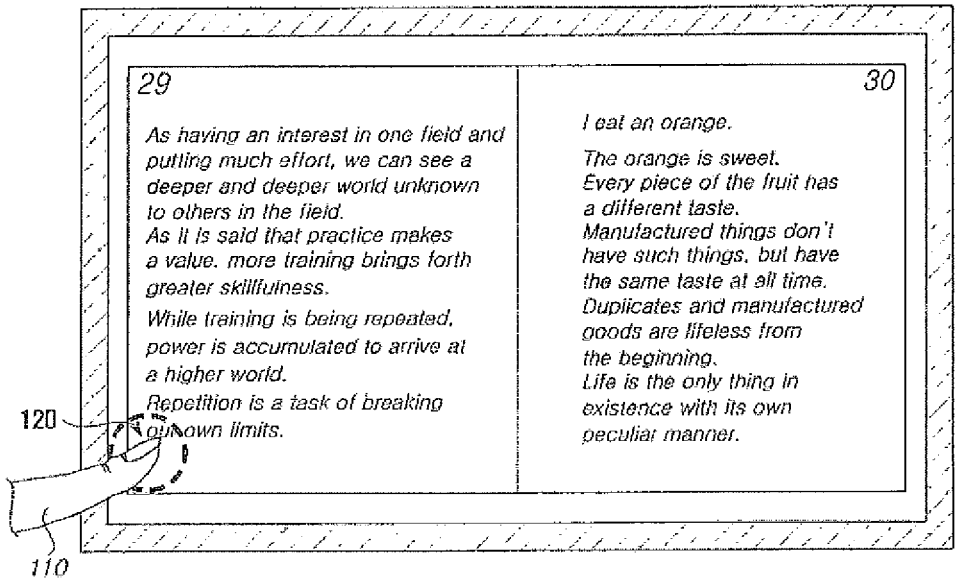
Figure 4B:
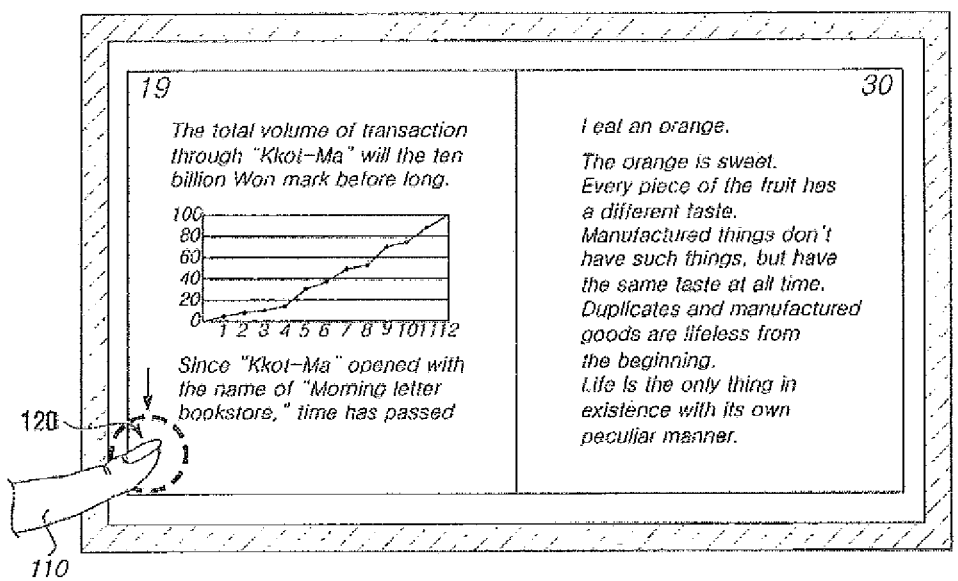
Figure 4D:
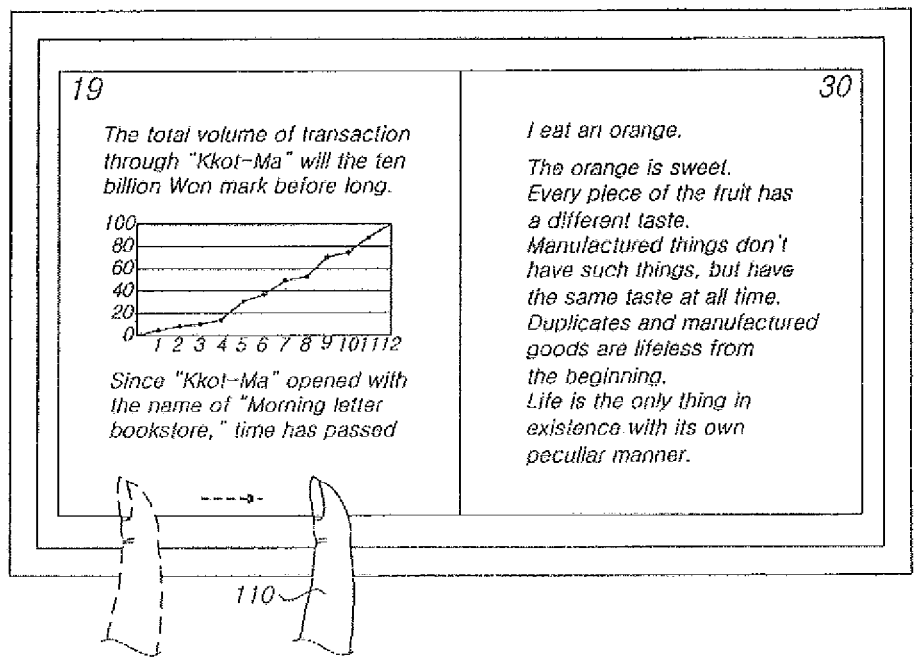

FIG. 4A illustrates a scene where a preview execution instruction is input, FIG. 4B illustrates a scene where a preview output page is changed, FIG. 4C illustrates a scene where a preview release instruction is input, and FIG. 4D illustrates a scene where a page selection instruction is input.

As shown in FIGS. 4A to 4D, according to the second embodiment of the present invention, since a volume display section is not displayed, a predetermined position (e.g. a right-hand or left-hand lower end) functions as an input section.

As shown in FIG. 4B, when a touching finger moves in a specified direction, a displayed preview page is changed (e.g. from page 29 to page 19). In this case, the change of the displayed preview page may be determined in such a manner as to display a specified page depending on a movement distance of the touching finger, or in such a manner as to sequentially change the displayed preview page at a speed specified depending on a movement distance of the touching finger. In the case of sequentially changing the displayed preview page, a page change direction may be changed depending on the movement direction of the touching finger (e.g. to move back to previously displayed pages when the touching finger moves in the upward direction).

Also, in this case, various output page display schemes may be employed in the preview mode, as in the first embodiment of the present invention.

Meanwhile, as shown in FIG. 4C, when the touch of the user has been released, it is recognized as a preview mode release instruction, so that the preview mode is released, and a page shift is performed to display the output page displayed before the preview mode.

In contrast, as shown in FIG. 4D, when the touch of the user has moved in a preset direction (e.g. in the right-hand direction), it is recognized as a page selection instruction, so that the preview mode is released, and simultaneously, a page shift is performed to display a page finally output in the preview.

In this case, the preset direction may vary depending on the characteristics of the reproduction apparatus and/or electronic documents.

Meanwhile, FIGS. 5A to 5D are views illustrating scenes in which electronic documents are reproduced according to a third embodiment of the present invention, wherein the third embodiment of the present invention shows a case where a preview function according to the present invention is executed in a single-page output mode.

Figure 5A:
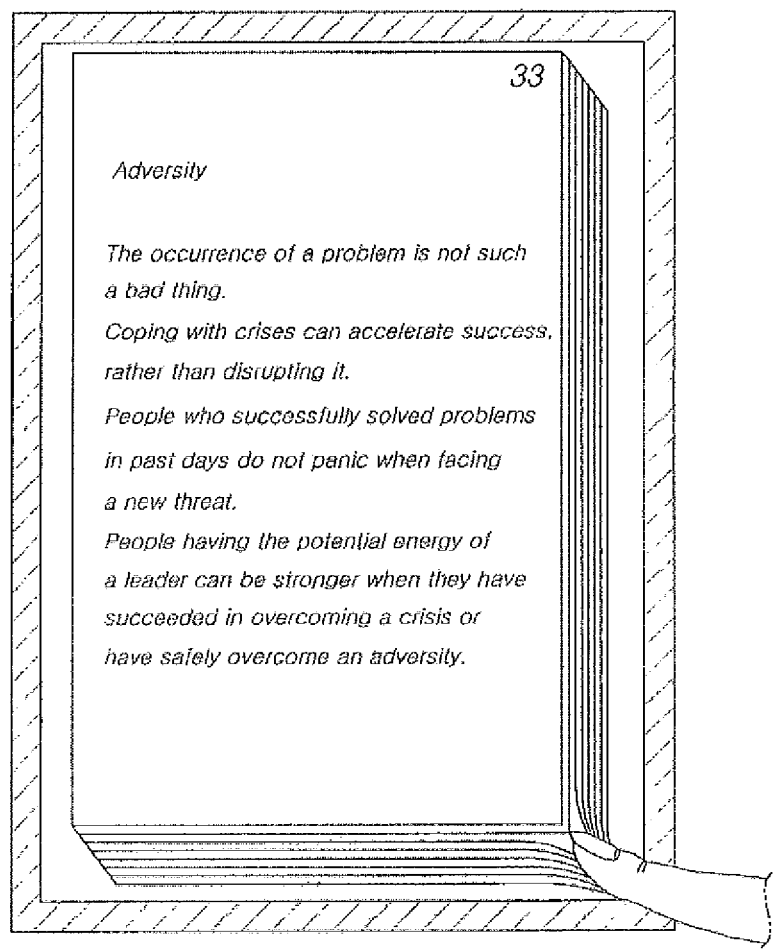
FIGS. 5A to 5D are views illustrating scenes in which electronic documents are reproduced according to a third embodiment of the present invention.
Figure 5B:
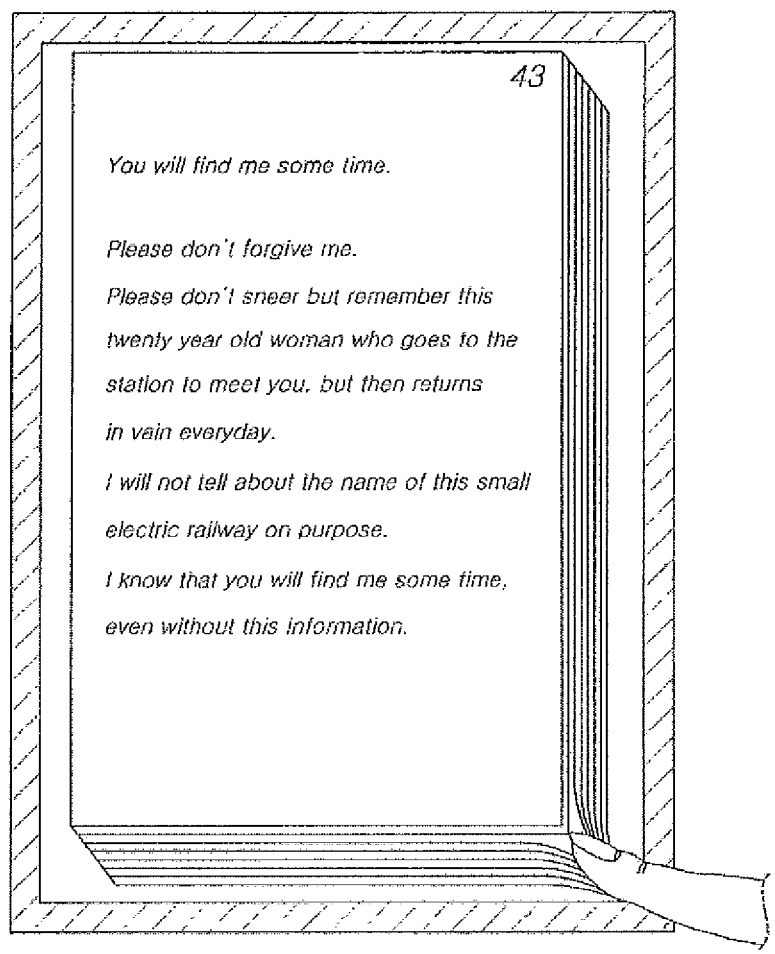
Figure 5C:
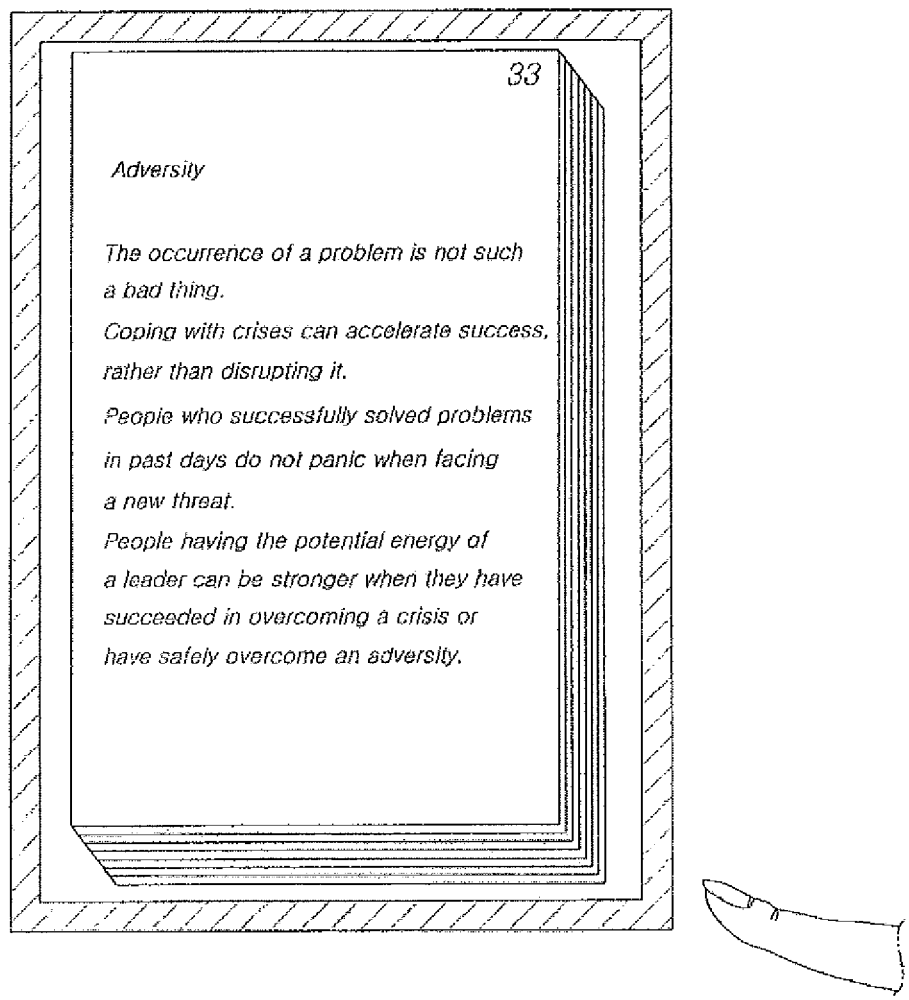
Figure 5D:
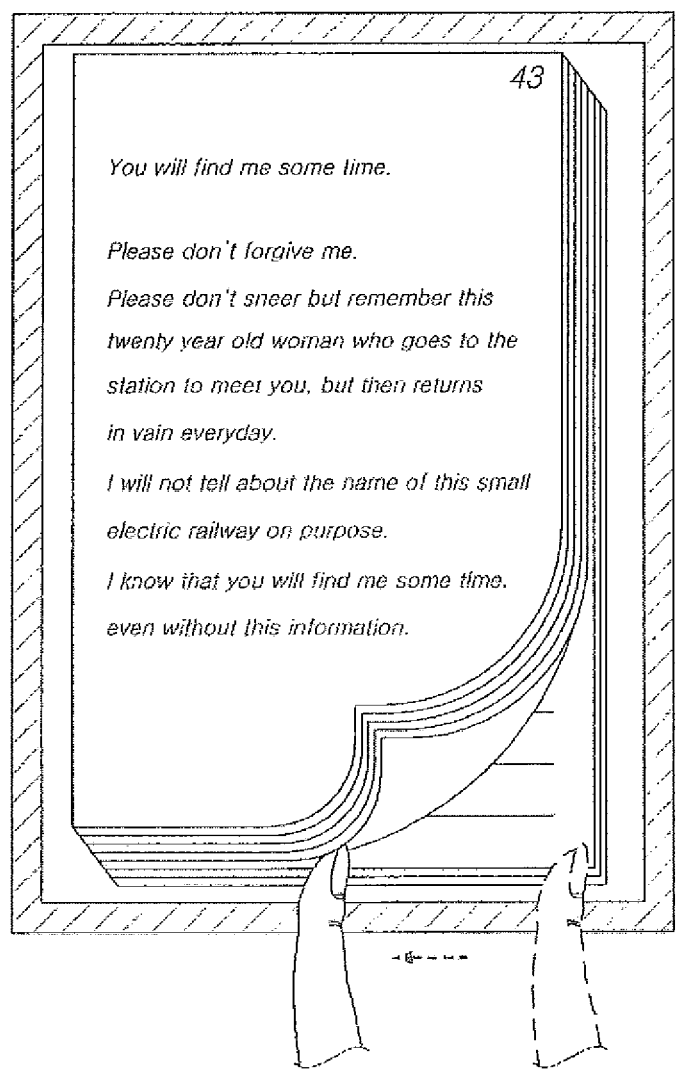

FIG. 5A illustrates a scene where a preview execution instruction is input; FIG. 5B illustrates a scene where a preview output page is changed, FIG. 5C illustrates a scene where a preview release instruction is input, and FIG. 5D illustrates a scene where a page selection instruction is input.

As shown in FIG. 5A, a preview execution instruction according to the third embodiment of the present invention is issued when the user touches a volume display section in an output screen.

When the user has touched the volume display section, a portion of the volume display section is displayed in a pressed form, which is the same as in the first embodiment of the present invention.

When the touch by the user has been input to the input region (i.e. the volume display section), a page corresponding to the touched position is displayed.

FIG. 5D shows a case where a touching finger moves in the right-hand downward direction within the volume display section. In FIG. 5D, it can be understood that, as the touched position is changed, an output page is changed from page 33 to page 43.

In this case, although it is not shown, a position indication icon may be displayed for the convenience of the user, as in the first embodiment of the present invention.

As shown in FIG. 5C, when a preview release instruction has been input, the preview mode is released, and a page shift is performed to display the page output before the preview mode. In this case, the preview release instruction is input as the touch of the user has been released.

Meanwhile, as shown in FIG. 5D, when a touching finger of the user moves in a preset direction (e.g. in the left-hand direction) in the preview mode, it is recognized as a page selection mode, so that a page finally output in the preview mode is established as an output page while the preview mode is released.

Figure 6:
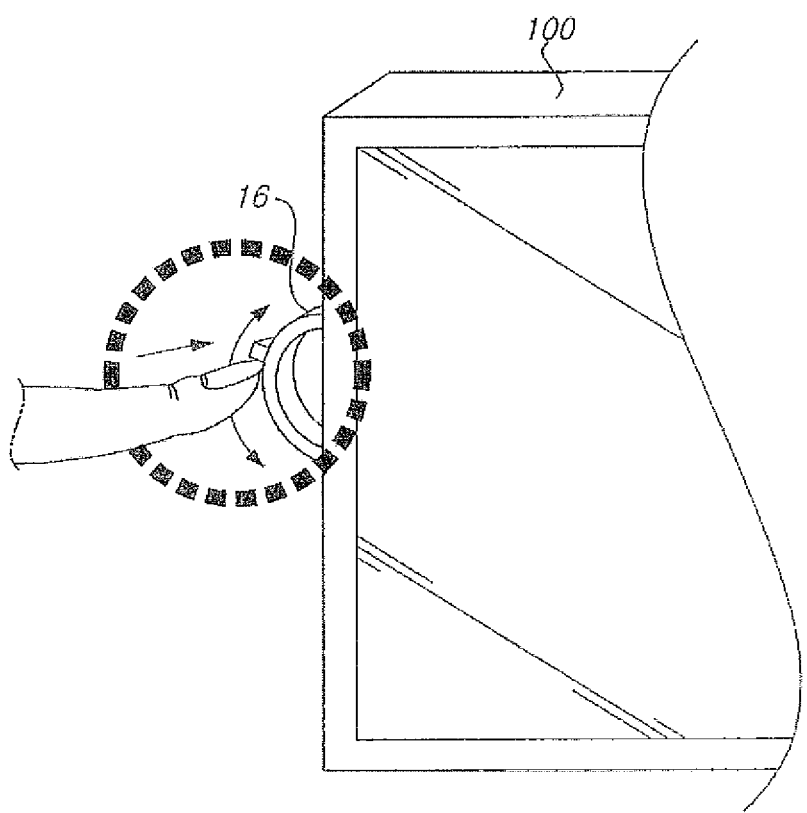
FIG. 6 is a view illustrating an electronic document reproduction scene according to a fourth embodiment of the present invention.

Meanwhile, FIG. 6 is a view illustrating an electronic document reproduction apparatus according to a fourth embodiment of the present invention, wherein the fourth embodiment of the present invention shows a case where user's instructions are input by a rotatable jog dial.

The display forms of an output screen according to the fourth embodiment of the present invention, including output page change forms, forms returning to a normal view mode upon a preview mode release, and page shift forms, are the same as described above. However, according to the fourth embodiment of the present invention, instructions for these display forms are input not through a touch scheme but through a joy dial 16.

The jog dial 16 is an input button having rotation and press input functions, as shown in FIG. 6. In a preview mode, when the jog dial 16 is rotated in the upward direction, an output page moves in the right-hand direction (in the direction of turning pages), and when the jog dial 16 is rotated in the downward direction, the output page moves in the left-hand direction. It goes without saying that the movement direction of the output page may be reversely established. Also, in a single-page view mode or a notepad type of display mode (for a book of which pages are turned upwardly), an output page may be changed to a previous page or a following page depending on a rotation direction of the jog dial 16.

In addition, the change speed of an output page may be determined according to a degree of rotation of the jog dial 16, and the output page may be continuously changed in accordance with the change speed.

When a press input through the jog dial 16 has been issued in the preview mode, it is recognized as a page selection instruction, so that a corresponding page is set as an output page, and the preview mode is released.

Meanwhile, the preview mode execution instruction and the release instruction may be input by one or more separate function buttons, may be issued by a touch input of the user, as in the aforementioned embodiments of the present invention, or may be issued by other types of input (e.g. a plurality of press inputs) through the jog dial 16.

Figure 7:
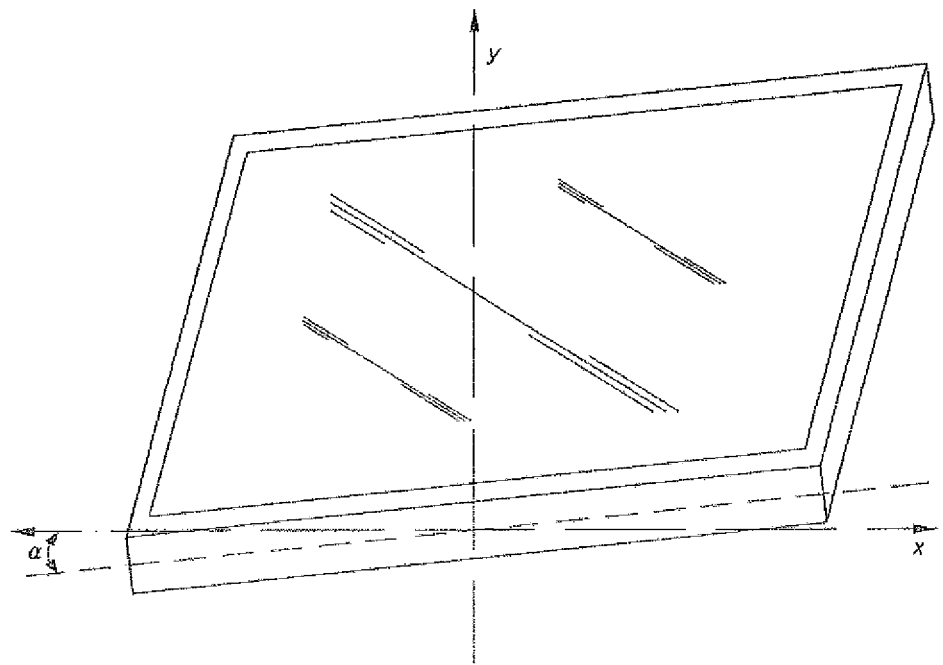
FIG. 7 is a view illustrating an electronic document reproduction scene according to a fifth embodiment of the present invention.

FIG. 7 is a view illustrating an electronic document reproduction apparatus 100 according to a fifth embodiment of the present invention, wherein the fifth embodiment of the present invention shows a case where the electronic document reproduction apparatus 100 is equipped with a sensing unit 40 for sensing the horizontal inclination of the electronic document reproduction apparatus 100, and the preview function according to the present invention is executed according to the sensing result of the sensing unit 40.

The display forms of an output screen according to the fifth embodiment of the present invention, including output page change forms, forms returning to a normal view mode upon a preview mode release, and page shift forms, are the same as described above. However, according to the fourth embodiment of the present invention, instructions for these display forms are determined not by a touch input, but by a horizontal inclination value of the electronic document reproduction apparatus.

That is, in the preview mode, when the electronic document reproduction apparatus 100 is inclined by a predetermined angle or more in the counterclockwise direction on the basis of a horizontal state, an output page may be changed in a direction of turning pages to the left, and when the electronic document reproduction apparatus 100 is inclined by a predetermined angle or more in the clockwise direction on the basis of the horizontal state, an output page may be changed in a direction of turning pages to the right.

In this case, when the inclination is continuously sensed, the output page may be continuously changed, in which a page change speed may be determined differently depending on the inclination angle of the electronic document reproduction apparatus 100.

Also, the electronic document reproduction apparatus 100 according to the fifth embodiment of the present invention may be implemented such that a screen touch by the user in the preview mode is recognized as a page selection instruction.

Meanwhile, in the electronic document reproduction apparatus 100 according to the fifth embodiment of the present invention, the preview mode execution instruction and the release instruction may be input by one or more separate function buttons, or may be issued by a touch input of the user, as in the aforementioned embodiments of the present invention.

Figure 8:
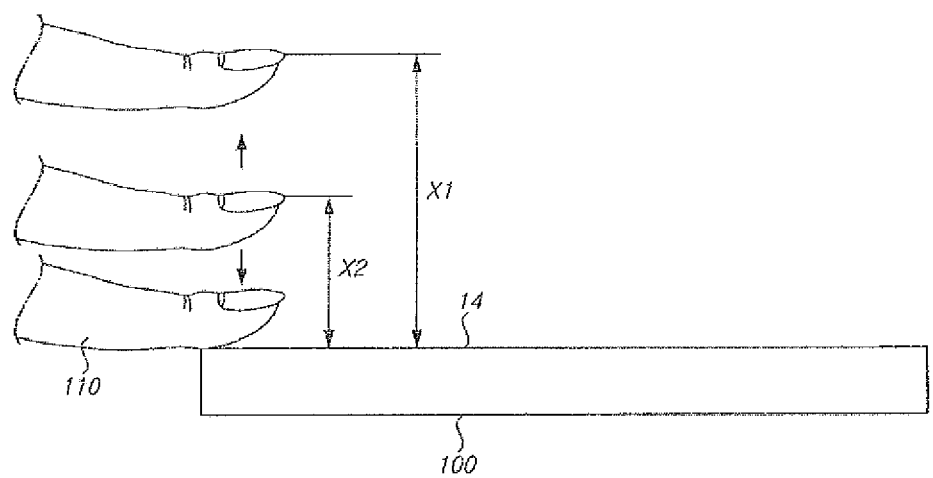
FIG. 8 is a view illustrating an electronic document reproduction scene according to a sixth embodiment of the present invention.

FIG. 8 is a view illustrating an electronic document reproduction scene according to a sixth embodiment of the present invention, wherein the sixth embodiment of the present invention shows a case of employing a touch panel which can sense a three-dimensional touch input position including height through a touch input unit.

The display forms of an output screen according to the sixth embodiment of the present invention, including output page change forms, forms returning to a normal view mode upon a preview mode release, and page shift forms, are the same as described above.

However, instructions for these display forms are input in a scheme different from those described above. That is, when a user's finger 110 has entered within a preset range "X1" above a specific position in a preview mode, an output page in the preview mode may be determined depending on the height of the finger 110.

Otherwise, a change speed of an output page may be established differently depending on the height of the finger 110. That is, on the basis of height "X2," an output page may be changed in a direction of turning pages to the right when the finger 110 is located between positions "X1" and "X2," and the output page may be changed in a direction of turning pages to the left when the finger 110 is located below height "X2."

In this case, a page change speed may be changed depending on the position of the finger 110, that is, the page change speed may be established differently depending on a distance from position "X2."

Also, according to the sixth embodiment of the present invention, the preview mode execution instruction and the release instruction may be input by various methods, as described above. That is, in the preview mode, when the finger 110 touches the screen, it may be recognized as a page selection instruction, and when the finger 110 is out of the range of "X1," it can be recognized as a preview mode release instruction.

Meanwhile, although it is not shown in the accompanying drawings, according to a seventh embodiment of the present invention, the present invention may be implemented by employing a touch panel which can sense a touch pressure thorough a touch input unit.

In the seventh embodiment of the present invention, the display forms of an output screen, including output page change forms, forms returning to a normal view mode upon a preview mode release, and page shift forms, are the same as described above.

However, a difference from other embodiments of the present invention is that touch pressure is added as one of input vectors for user's instructions.

For example, in the case of employing a reproduction apparatus having the same form as that according to the first embodiment of the present invention, the seventh embodiment of the present invention may be implemented such that a page selection instruction can be issued when a touching finger moves in a predetermined direction with a touch pressure equal to or greater than a predetermined value. In this case, the user can obtain a feeling as if he/she turns real pages.

Also, the output page is continuously changed in the preview mode, the page change speed may be determined according to the touch pressure.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

The scope of the present invention is not limited to the embodiments disclosed in the present invention, but is defined by the claims and the equivalents thereof. Those skilled in the art will appreciate that various modifications, additions and substitutions are possible, without departing from the scope and spirit of the invention as disclosed in the accompanying claims.

What is claimed is:

1. An electronic device comprising:
a single display unit having a length that is different from a width of the single display unit, and including a touch screen and configured to display at least one current page on the single display unit,
wherein the single display unit is configured to enable the at least one current page to be output transversely as well as longitudinally with respect to the single display unit,
wherein the at least one current page is displayed on the single display unit in a single-page output mode when the at least one current page is output longitudinally with respect to the single display unit, and
wherein the at least one current page is displayed on the single display unit in a double-page output mode when the at least one current page is output transversely with respect to the single display unit;
an input unit configured to receive a drag touch input from a user applying physical contact along the touch screen; and
a controller configured to cooperate with the single display unit and the input unit to:
detect, via the input unit, the drag touch input received from the user;
display, on the single display unit, information pertaining to a preview page associated with the drag touch input; and
replace the at least one current page with one or more new pages including the preview page,
wherein the at least one current page is a single current page in the single-page output mode, and the single current page is replaced with the preview page on the single display unit, and
wherein the at least one current page is at least one of first and second current pages in the double-page output mode, and the first and second current pages are replaced with the new pages including the preview page on the single display unit.

2. The electronic device as claimed in claim 1, wherein a graphical object is displayed on the single display unit, and the displayed information pertaining to the preview page associated with the drag touch input includes a page number.

3. The electronic device as claimed in claim 2, wherein the graphical object is displayed in the form of an image of book edges or an image of a page edge, and the received drag touch input is made to or near the displayed image of book edges or the displayed image of page edge.

4. The electronic device as claimed in claim 1, wherein the preview page and the current page replaced b preview page are non-consecutively numbered pages.

5. The electronic device as claimed in claim 1, wherein in the double-page output mode, one of the new pages is displayed at a left hand side of the single display unit, and the other of the new pages is displayed at a right hand side of the single display unit at the same time.

6. The electronic device as claimed in claim 1, wherein information displayed on the single display unit is changed according to a progress of the drag touch input.

7. An electronic device comprising:
a single display unit having a length that is different from a width of the single display unit, and including a touch screen; and
a controller connected to the single display unit and configured to:
display, on the touch screen, one or more predetermined pages containing viewable contents,
receive a touch-and-drag input applied to the touch screen, and
according to the touch-and-drag input, flip the one or more predetermined pages to at least one new page so that the at least one new page is displayed on the touch screen,
wherein the single display unit is configured to enable the one or more predetermined pages to be output transversely as well as longitudinally with respect to the single display unit,
wherein a single new page replaces the one predetermined page in a single-page output mode when the displayed the one predetermined page is output longitudinally with respect to the single display unit, and wherein a plurality of new pages replace the predetermined pages in a double-page output mode when the predetermined pages are output transversely with respect to the single display unit.

8. The electronic device as claimed in claim 7, wherein the at least one new page and the one or more predetermined pages replaced by the at least one new page are non-consecutively numbered pages.

9. The electronic device as claimed in claim 7, wherein an image is displayed on the touch screen with the one or more predetermined pages,
   wherein when the touch-and-drag input is applied to the displayed image, the controller is configured to display information pertaining to a page associated with the touch-and-drag input, and
   wherein the displayed information pertaining to the page associated with the touch-and-drag input includes a page number.

10. The electronic device as claimed in claim 7, wherein the touch-and-drag input includes a touch release.

11. The electronic device as claimed in claim 7, wherein one of the new pages is displayed at a left hand side of the single display unit, and the other of the new pages is displayed at a right hand side of the single display unit at the same time.

12. A method for controlling an electronic device including a single display unit, an input unit and a controller, the single display unit having a length that is different from a width of the single display unit, the method comprising:
   displaying at least one current page on the single display unit, wherein the single display unit is configured to enable the at least one current page to be output transversely as well as longitudinally with respect to the single display unit,
   the displaying step including displaying the at least one current page on the single display unit in a single-page output mode when the at least one current page is output longitudinally with respect to the single display unit, and displaying the at least one current page on the first region of the single display unit in a double-page output mode when the at least one current page is output transversely with respect to the single display unit;
   receiving, via the input unit, a drag touch input to the single display unit;
   displaying, on the single display unit, information pertaining to a preview page associated with the drag touch input; and
   replacing the at least one current page with one or more new pages including the preview page,
   wherein the at least one current page is a single current page in the single-page output mode, and the single current page is replaced with the preview page on the single display unit; and
   wherein the at least one current page is at least one of first and second current pages in the double-page output mode, and the first and second current pages are replaced with the new pages including the preview page.

13. The method as claimed in claim 12, wherein a graphical object is displayed on the single display unit, and
   the displayed information pertaining to the preview page associated with the drag touch input includes a page number.

14. The method as claimed in claim 13, wherein the graphical object is displayed in the form of an image of book edges or an image of page edge, and the drag touch input is made to or near the displayed image of book edges or the displayed image of page edge.

15. The method as claimed in claim 12, wherein the preview page and the current page replaced by the preview page are non-consecutively numbered pages.

16. A method for controlling an electronic device including a controller and a single display unit having a touch screen, the single display unit having a length that is different from a width of the single display unit, the method comprising:
   displaying, on the touch screen, one or more predetermined pages containing viewable contents;
   receiving a touch-and-drag applied to the touch screen; and
   according to the touch-and-drag input, flipping, by the controller, the one or more predetermined pages to at least one new page so that the at least one new page is displayed on the touch screen,
   wherein the single display unit is configured to enable the one or more predetermined pages to be output transversely as well as longitudinally with respect to the single display unit,
   wherein a single new page replaces the one predetermined page displayed on the touch screen in a single-page output mode when the displayed one predetermined page is output longitudinally with respect to the single display unit, and
   wherein a plurality of new pages replace the predetermined pages in a double-page output mode when the predetermined pages are output transversely with respect to the single display unit.

17. The method as claimed in claim 16, wherein the at least one new page and the one or more predetermined pages replaced by the at least one new page are non-consecutively numbered pages.

18. The method as claimed in claim 16,
   wherein an image is displayed on the touch screen with the one or more predetermined pages,
   wherein when the touch-and-drag input is applied to the displayed image, the controller is configured to display information pertaining to a page associated with the touch-and-drag input, and
   wherein the information pertaining to the page associated with the touch-and-drag input includes a page number.

19. The method as claimed in claim 16, wherein the touch-and-drag input includes a touch release.

20. The method as claimed in claim 16, wherein one of the new pages is displayed at a left hand side of the single display unit, and the other of the new pages is displayed at a right hand side of the single display unit at the same time.

21. The electronic device as claimed in claim 1, wherein the displayed information pertaining to the preview page associated with the drag touch input varies according to a movement of the drag touch input.

22. The electronic device as claimed in claim 9, wherein the displayed information pertaining to the page associated with the touch-and-drag input varies according to a movement of the touch-and-drag input.

23. The method as claimed in claim 12, wherein the displayed information pertaining to the preview page associated with the drag touch input varies according to a movement of the drag touch input.

24. The method as claimed in claim 18, wherein the displayed information pertaining to the page associated with the touch-and-drag input varies according to a movement of the touch-and-drag input.

* * * * *